United States Patent [19]

Stalcup et al.

[11] 4,451,118

[45] May 29, 1984

[54] COMPOSITE LASER MIRROR

[75] Inventors: Robert K. Stalcup, Lake Park; Warren R. Sigman, North Palm Beach, both of Fla.; Karl M. Prewo, Vernon, Conn.

[73] Assignee: United Technologies Corporation, Hartford, Conn.

[21] Appl. No.: 219,770

[22] Filed: Dec. 23, 1980

[51] Int. Cl.³ ............................................... G02B 5/08
[52] U.S. Cl. ...................................... 350/310; 501/32; 501/53
[58] Field of Search ................... 350/310, 288; 106/56

[56] References Cited

U.S. PATENT DOCUMENTS

| | | | |
|---|---|---|---|
| 3,645,608 | 2/1972 | Staley et al. | 350/310 |
| 3,681,187 | 8/1972 | Bowen et al. | 161/170 |
| 3,713,959 | 1/1973 | Rottmayer et al. | 161/59 |
| 3,836,236 | 9/1974 | Kirk et al. | 350/310 |
| 3,926,510 | 12/1975 | Locke et al. | 350/310 |
| 3,942,880 | 3/1976 | Zeiders, Jr. | 350/310 |
| 4,214,818 | 7/1980 | Choyke et al. | 350/310 |

Primary Examiner—Jon W. Henry
Attorney, Agent, or Firm—Harry J. Gwinnell

[57] ABSTRACT

A laser mirror is described having a base section, a backing section, and a laser radiation reflecting surface. The base section and backing section are formed of graphite fiber reinforced glass. The fibers in the base section are oriented in a plane parallel to the laser radiation reflecting surface. The fibers in the backing section are oriented in a plane perpendicular to the radii of the reflecting surface. Based on the materials employed and the orientation of the fibers, a laser mirror with improved thermal distortion properties results.

9 Claims, 5 Drawing Figures

COMPOSITE LASER MIRROR

CROSS REFERENCE TO RELATED APPLICATIONS

Attention is directed to the following commonly assigned, copending applications: Ser. No. 219,771, filed Dec. 23, 1980 entitled "Cooled, Thermally Stable Composite Mirrors and Methods of Making the Same" which is directed to a cooled thermally stable composite laser mirror; Ser. No. 206,911, filed Nov. 5, 1980 entitled "Method of Making a Graphite-Glass Composite Laser Mirror" which is directed to a graphite-glass composite laser mirror; and Ser. No. 54,098, filed July 2, 1979, now U.S. Pat. No. 4,256,378 entitled "Graphite-Glass Composite Laser Mirror" which is directed to a graphite-glass composite laser mirror.

DESCRIPTION

1. Technical Field

The field of art to which this invention pertains is composite optical elements of the reflecting type, and specifically laser radiation reflecting elements.

2. Background Art

While there is a myriad of art covering laser mirrors (e.g., U.S. Pat. Nos. 3,836,236; 3,926,510; and 3,942,880) because of the many peculiar physical property requirements of such mirrors in this environment, both a variety of materials and designs have been employed in attempts to optimize the particular properties necessary for a composite used in this particular environment. For example, while a laser mirror in this environment must have the requisite reflective properties, cost and availability of materials is also an important factor. Such mirrors should also desirably have low density for ease of use in the types of apparatus where they will be used, but without porosity. Furthermore, such mirrors ideally should have high elastic stiffness and high strength along with high fracture toughness. And stability is of the utmost importance both from the point of view of the fine resolution-type work environment the mirrors will be used in, and the inaccessibility of the apparatus which these mirrors would be used in, for example outer space applications. These stability properties include low thermal expansion, high thermal conductivity, and environmental stability. Environmental stability includes such things as dimensional stability and mirror integrity regardless of moisture conditions, vacuum conditions, or ultraviolet light exposure, and mirror integrity and dimensional stability at both high and low temperatures. Currently, laser mirrors are basically either highly polished metal blocks (high energy laser application), low expansion glass, or graphite reinforced resin matrix composites (low energy laser application). Glass optics lack durability. Currently used composites fall off in one or more of the above-cited property areas. Furthermore, the popular use of resins in conventional composites of the above type inherently suffer from dimensional changes due to absorption or desorption of moisture, evolution or organic constituents due to prolonged exposure to high vacuum, breakdown due to prolonged exposure to ultraviolet radiation, low thermal conductivity, high coefficients of thermal expansion, and rapid decrease in integrity when used above 300° C.

DISCLOSURE OF INVENTION

The present invention is directed to laser mirrors comprising a base section, a backing section and a laser radiation reflecting surface. The laser radiation reflecting surface is attached to the backing section which is mounted on the base section. The base section comprises a glass matrix reinforced with graphite fibers oriented in at least one plane parallel to the mirror surface. The backing section comprises graphite fibers oriented substantially perpendicular to the radii of the reflecting surface. Such composite orientation results in laser mirrors with much improved resistance to distortion under heat load.

The foregoing, and other features and advantages of the present invention, will become more apparent from the following description and accompanying drawing.

BEST MODE FOR CARRYING OUT THE INVENTION

While any graphite fiber with the requisite high strength and good modulus of elasticity can be used in the laser mirrors of this invention, such as Hercules HMS graphite fiber, Celanese GY-70 (formerly DG102) graphite fibers are particularly suitable. This fiber consists of 384 fibers/tow and has an oxidized finish. It is 8 microns in diameter, has a modulus of elasticity of 531 GPa ($77 \times 10^6$ psi). It has a tensile strength of 1724 MPa (250 ksi) and a density of 1.96 gm/cm$^3$. This fiber is used at about 40 to 70% by volume based on the graphite-glass composite and preferably at about 60% by volume.

The glass used was particularly selected to have a very low coefficient of thermal expansion preferably matched closely, but not equal to that of the graphite fibers used since the graphite has a highly negative axial coefficient of thermal expansion and the glass has a positive but small coefficient of thermal expansion. Particularly suitable for the purposes of this invention is a borosilicate glass (Corning Glass Words CGW 7740) with an aneal point of 500° C., a softening point of 821° C., a liquidus temperature of 1017° C., a density of 2.23 grams per cubic centimeter, an index of refraction of 1.474, a dielectric constant of 4.6, a coefficient of linear expansion of 32.5 cm/cm°C.$\times 10^{-7}$ and a modulus of elasticity of $9.1 \times 10^6$ psi ($6.4 \times 10^9$ kg per square meter). The particle size of the glass should be such that at least 90% passes through a 36.0 mesh screen.

While a variety of methods may be used to produce the base section of the laser mirror of the present invention, the preferred method comprises continuously unwinding a tow of graphite fibers from a spool at a moderate rate of speed and passing such fibers through a slip of powdered glass, solvent and plasticizer to impregnate the tow. The impregnated fibers are then rewound onto a large rotating spool. An exemplary slip composition may be composed of 250 grams of powdered glass in 780 ml of propanol. An alternative composition may comprise 85 grams of the glass and 200 grams of propanol, 10 grams of polyvinyl alcohol and 5 drops (approx. 1 cc) of a wetting agent, Tergitol ®. The receiving drum is preferably run at 1 revolution per munite or linear speed of 5 feet per minute (2.54 cm per sec). Excess glass and solvent can be removed by pressing a squeegy against the drum as it winds. Preferably the ground glass is sizes so that 90% of it passes through a −325 mesh sieve. The thus impregnated tape is then dried either at ambient temperature or with a radiant heating source to remove solvent.

Figure 1:
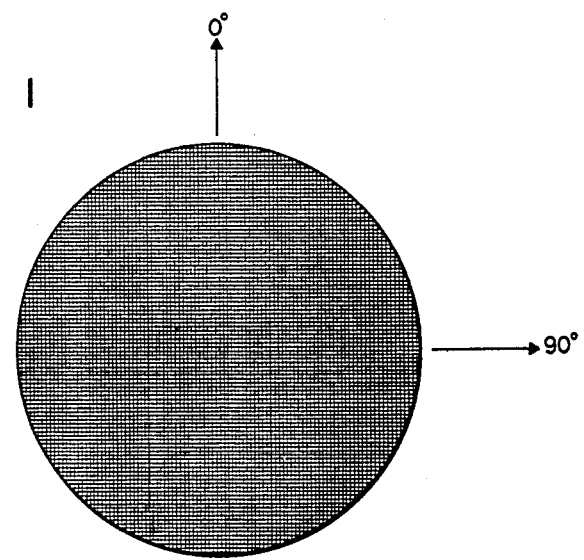
FIG. 1 shows a composite mirror according to the present invention.
Figure 2:
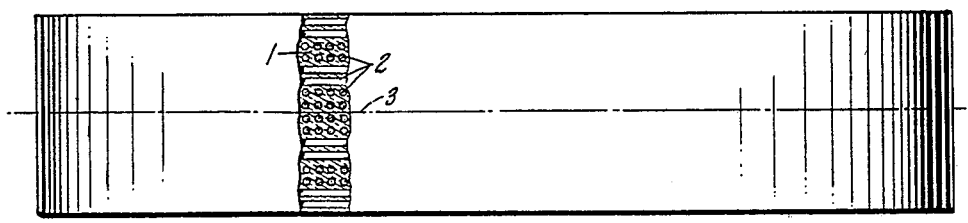
FIG. 2 shows a base section according to the present invention.

Following the impregnation the fiber is removed from the drum and cut into strips up to the diameter of the mirror to be fabricated. While the typical test samples were about 10 cm in diameter, mirrors up to 20 cm in diameter have also been made by the processes of the present invention. However, mirrors of even larger diameters can be made according to the present invention. The fibers are then preferably laid in alternating ply stack-up sequence of 0° and 90° as illustrated by FIGS. 1 and 2. The assembled composite is then hot pressed, either under vacuum or inert gas such as argon, in metal dies coated with colloidal boron nitride, or graphite dies sprayed with boron nitride powder, at pressures of 6.9 to 13.8 MPa (1000-2000 psi) and temperatures of 1050°-1450° C. Additional glass in the form of powder may also be inserted between each layer as it is laid in an attempt to achieve a preferred 40-70% by volume loading of graphite fiber in the composite. Also, the mold can be vibrated to insure uniform distribution of the glass over the laid fiber surfaces.

While alternating 0° and 90° fiber laying was the most common base sample arrangement used, 0° and 45°; 0°, 45° and 90°; 0°, 30° and 90°; 0° and 60°, etc., fiber laying can also be used. In fact, the 0°, 45° and 90° and 0° and 60° fiber laying give additional advantage of isotropy of elastic stiffness. It is preferred that the base material of the composite mirror be both balanced and have a central plane of symmetry as described in commonly assigned, copending U.S. patent application Ser. No. 54,098, filed July 2, 1979, the disclosure of which is incorporated by reference. This is specifically demonstrated by FIG. 2 which is the end view of a 0° and 90° specimen where 1 indicates the glass matrix, 2 indicates the graphite fibers and 3 indicates the central plane of symmetry.

Figure 3:
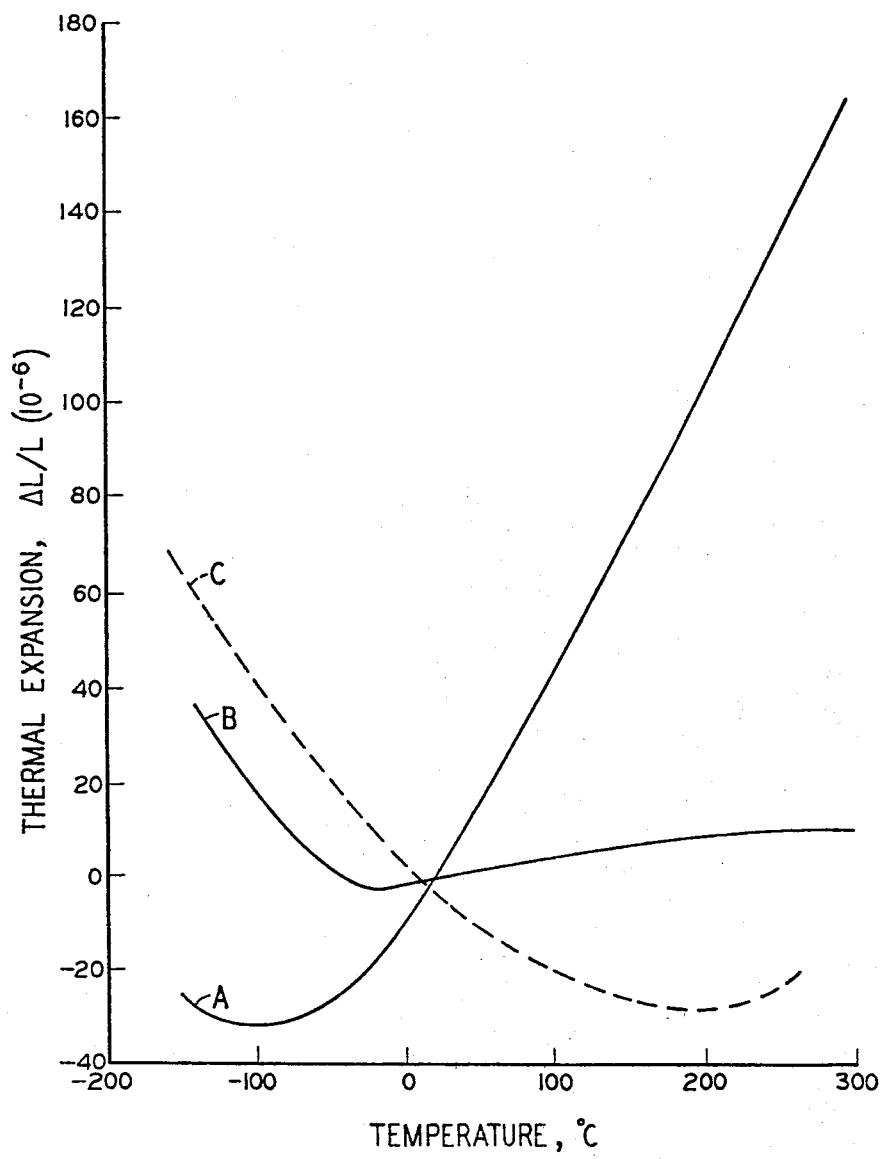
FIG. 3 shows the thermal expansion characteristics of a base material according to the present invention.

As can be seen from FIG. 3, the thermal expansion characteristics of a 0° and 90° graphite-glass lay up are on a par with other conventional materials known for their dimensional stability. Curve A represents unreinforced fused silica (N.B.S. reference number 739 measurement). Reference B represents unreinforced ULE glass (Corning Code 7971 measurement). And Reference C represents the 0° and 90° graphite glass of the present invention. Because of its superiority in other properties of strength, stiffness, thermal conductivity, and toughness, the graphite reinforced glass is the overall superior material.

Figure 4:
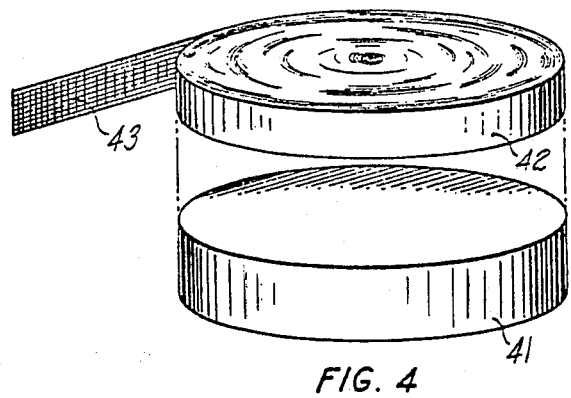
FIG. 4 shows a composite mirror of the present invention in separated parts.

There are three methods by which the backing section (42 in FIG. 4) of the mirrors according to the present invention can be made. The first is the "jelly roll" method where the graphite fibers laid up in the glass matrix (character 43 in FIG. 4) in a 0° and 90° orientation are lightly pressed to form a sheet which is handleable. Following this, the flat sheet is rolled, as a jelly roll, to a configuration larger than that ultimately desired. The jelly roll is then compressed from all sides, preferably circumferentially to form a cylinder. The individual backing sheets are then sliced (e.g. in 0.2 inch (0.5 cm) thick slices) from such cylinder. This represents an essential part of the invention which distinguishes over mirrors of the prior art since the resulting graphite fibers which remain perpendicular to the laser radiation reflecting surface conduct heat away from the mirror surface, such as, for example, down to the water or other coolant fluid in the passages shown in FIG. 5. This helps to reduce thermal distortion. The fibers also have a reduced growth in this direction. Additionally, in this embodiment, the circumferentially wrapped fibers forming a series of hoops resist axial growth which further minimizes bending distortion and also overall distortion.

Another method of forming the backing sheets according to the present invention involves hot pressing a unidirectional graphite fiber lay up in the glass matrix to form a sheet and stacking a plurality of these sheets atop one another until the proper thickness at least that as large as the diameter of the backing sheet is attained. This block is then sliced or cut to make a plurality of backing sheets.

Another method of making the backing sheet according to the present invention comprises hot pressing a unidirectional fiber lay up of the graphite fibers in the glass matrix as in the immediately preceding method. However, rather than stacking a plurality of these sheets, the first pressed sheet is sliced into segments which are then turned on end and the plurality of slices are then hot pressed from the side to form the individual backing sheet.

In all of the above methods, while a backing sheet of any desired dimensions can be made based upon the mirror design desired, the backing sheets tested were square sheets about 3 inches (7.6 cm) on a side and about 0.2 inch (0.5 cm) thick.

In the jelly roll method, it is possible to use 0° and 90° material in woven form as opposed to alternate laying of the fibers as described above. And with the latter two methods, it is also possible to wrap the unidirectional fiber block with a graphite fiber treated with the glass matrix prior to the second pressing. Such wrapping would be circumferentially around the outside of the backing sheet. This would provide greater mechanical strength to the backing sheet in addition to multidirectional thermal conductivity. Pressing conditions for all three methods can be as described above for the base section, the key of course, being consolidation of the graphite-glass material into a usable composite.

Because the thermal conductivity through the graphite fibers is significantly greater through the length of the fiber in a direction parallel to the length of the fiber than in a direction normal to the fiber, the backing sheet, having the perpendicularly laid fibers would conduct heat away from the mirror surface at a greater rate than fibers laid as in the base section would. Additionally, because of the overall multidirectional fiber laying in the composite article, the resistance to thermal distortion would be significantly improved over conventional mirrors in this art. Accordingly, this combination of improved thermal conductivity and resistance to warpage results in a mirror with properties far superior to conventional mirrors in this art.

With reference to the backing sheet, it should be noted that referring to the fiber orientation, by substantially perpendicular to the reflecting surface is meant graphite fibers normal ($\perp$) to the plane of the reflecting surface, i.e. fibers in a plurality of planes perpendicular to the radii of the reflecting surface ($\pm 5°$ ⩊ for example).

Once the backing sheet (e.g. 42 in FIG. 4) and base material (e.g. 41 in FIG. 4) are formed, bonding can take place in a variety of ways, e.g. utilizing a conventional epoxy or the glass in powdered form of the matrix or any of the methods disclosed in commonly assigned U.S. patent application Ser. No.s 215,281, 215,282, and 215,283 filed Dec. 12, 1980, the disclosures of which are incorporated by reference. As described in Ser. No. 215,281 the pieces to be joined are first ground flat or to matching contours. Gold or other suitable metal is then sputtered onto the surfaces to be joined. Gold-tin foil or other suitable braze material is placed between the surfaces and the assembly heated to the melting point of the braze. Such brazing is preferably done in a non-oxidizing atmosphere such as argon or hydrogen. Or as described in Ser. No. 215,282 the two surfaces to be joined can be bonded with a glass composition comprising a high lead oxide content glaze (Drakenfeld E1576) and beta-spodumene. Modifiers such as fine particle colloidal silica in water can also be included (DuPont Ludox). The bonding process includes applying a slurry of the glass composition to the surfaces to be bound followed by drying and hot pressing the surfaces together. The hot pressing can take place, for example, in argon at a pressure of up to 300 psi ($2.1 \times 10^6$ NT/M$^2$) for about 20 minutes at temperatures on the order of 750° C. An exemplary composition comprises 25 grams of Drakenfeld E1576, 25 grams of Al-95 (from RGC/RFC) and 2 grams of Ludox in 200 ml of isopropyl alcohol. Al-95 is a 98% beta-spodumene manufactured by Research Organics/Inorganic Chemical Corporation, Sun Valley, Calif. The process can best be described as a transition liquid phase bonding.

The parts (e.g. 41 and 42 in FIG. 4) can also be bonded as described in Ser. No. 215,283. The surfaces of the two parts to be bonded are ground to remove excess glass. The parts can be cleaned ultrasonically in methanol and heated at 200° C. for one hour. An approximately 800 Å thick layer of chromium is then sputtered onto the top surfaces of the two pieces followed by sputtering approximately 1 micron of gold onto the same surfaces. The two pieces are then placed face to face on a hot plate at 280° C. and soldered together utilizing a eutectic alloy of 80% gold and 20% tin. Other variations of this theme can be employed such as precoating with nickel and utilizing a nickel based solder. The same is true of copper, silver, gold, nichrome, chromium and other metals and their respective solders. The composite mirror is also preferably made with a glass rich layer on the mirror side of the backing section. This aids in the subsequent polishing and deposition of the separate laser reflecting layer, such as are conventionally used in the laser mirror art, e.g. chromium-gold alloy. Such surface layers can be applied by conventional methods commonly used to deposit thin uniform layers, for example, less than one mil thick, of such material such as vapor deposition and cathode sputtering.

The coolant passages can be formed by conventional drilling or etching methods or as in commonly assigned U.S. patent application Ser. No. 219,711, filed Dec. 23, 1980, the disclosure of which is incorporated by reference. For example, as described in Ser. No. 219,711, the cooling channels can be formed by laying up a mixture of graphite-fibers and particulate glass as described above followed by laying a plurality of wires or tubes in the desired cooling channel pattern. After the wires or tubes are laid, additional layers of graphite-fibers and particulate glass are built up on the composite followed by hot pressing the entire graphite-glass-wire mixture. Subsequently, the metal wires or tubes are removed either mechanically by pulling or drilling or chemically by etching. Other variations which may be used to form the cooling channels as described in Ser. No. 219,711 include hot pressing the graphite glass material of either the top layer or bottom layer on a mold having a plurality of metal wires already on the mold surface. Such wires after pressing can be pulled or otherwise removed from the top or base section and upon lamination of the top and base sections, the cooling channel walls are completed. And alternatively, as described in Ser. No. 219,711, a plurality of grooves can be formed in either the top or base section, the pores can be filled with metal strips, powdered metal or high temperature ceramic powder and the base or top portion can then be formed and hot pressed against the already grooved top or base section followed by removal of the channel masking strips from the channels.

Another method of forming such channels includes utilizing any of the above pressing methods with a channel forming insert such as a metal rod which is wrapped with graphite or other high temperature stable fibers such as silicon carbide, followed by removing the metal insert. After removal of the metal insert, each coolant passage is lined with a circumferentially oriented fiber. With fibers in this orientation, the coolant pressure is easily restrained by the reinforced passage walls. Another advantage of such an orientation is the improved distribution of heat around the passages due to the thermal conductivity of the fibers.

Figure 5:
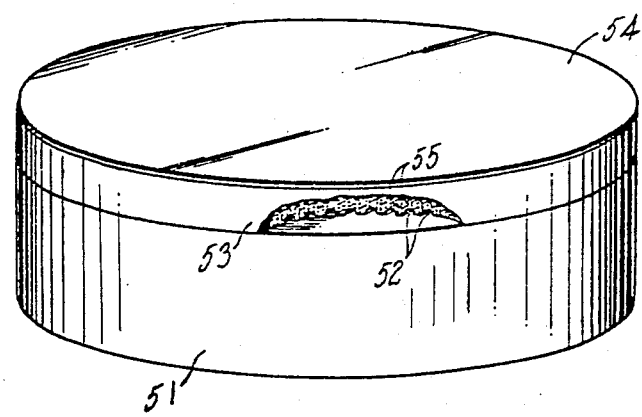
FIG. 5 shows a sectioned view of a finished mirror according to the present invention.

FIG. 5 shows a sectioned view of a finished mirror according to the present invention where 51 is the graphite-glass composite base material, 53 the backing section with coolant channels 52, 55 the graphite fibers vertically oriented toward the reflecting surface 54, preferably disposed on a glass rich surface layer (not shown) at least 0.5 mil and preferably up to about 2 mils thick.

Figure 6:
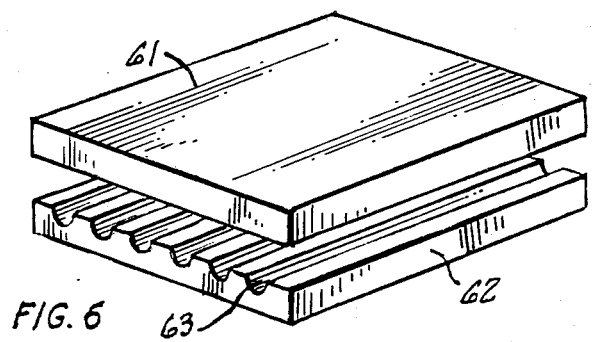
FIG. 6 shows a composite mirror according to the present invention having coolant passages in the base section.

FIG. 6 demonstrates the embodiment where the coolant passages 63 are formed in the base section 62 and are completed by lamination with the backing section 61.

As described, the fibers in the two composites are oriented to provide much lower distortion under heat load than presently attainable with any laser mirrors known. This is accomplished by orienting the graphite fibers to provide a high heat transfer coefficient normal to the reflecting surface (in three dimensions in the jelly roll embodiment) in the backing section and provide axial insulation with low coefficient of thermal conductivity in the axial direction and low coefficient of thermal expansion in the radial direction in the base section. The heat is therefore, contained in the heat exchanger and can be removed, for example by flowing water coolant through the heat exchanger-backing portion. Additionally, a glass rich layer can be created at the optical surface as described above that will greatly improve the mirror polishability.

The backing layer itself provides higher thermal conductivity in a direction perpendicular to the mirror surface and ultra low thermal expansion in the axial direction and in the alternative embodiments in the circumferential direction along the graphite fibers. The base material as described above provides, using a multidirectional lay up of mat, ultra low thermal expansion in the radial direction and low conductivity in the axial direction.

Although this invention has been shown and described with respect to detailed embodiments thereof, it will be understood by those skilled in the art that various changes in form and detail thereof may be made without departing from the spirit and scope of the claimed invention.

We claim:

1. A laser mirror comprising a base section attached to a backing section having a laser radiation reflecting surface, the base section comprising a glass matrix reinforced with a plurality of graphite fibers oriented in at least one plane parallel to the mirror surface, the backing section disposed between the base section and the reflecting surface and comprising a glass matrix reinforced with a plurality of graphite fibers oriented perpendicular to the reflecting surface.

2. The laser mirror of claim 1 which additionally contains graphite fibers in the backing section oriented perpendicular to the radii of the reflecting surface in at least one plane parallel to the reflecting surface.

3. The laser mirror of claim 1 having coolant passages in the backing section.

4. The laser mirror of claim 1 having coolant passages in the base section.

5. The laser mirror of claims 1, 2 or 3 containing 40-70% volume graphite fibers, and having a graphite fiber orientation in the base section of the composite of 0° and 90°; 0°, 45° and 90°; or 0° and 60°.

6. The laser mirror of claims 1, 2 or 3 containing about 60% by volume graphite fiber.

7. The laser mirror of claims 1, 2 or 3 wherein the glass comprises borosilicate.

8. The laser mirror of claims 1, 2 or 3 wherein the graphite fiber has a modulus of elasticity of at least 531 GPa, a tensile strength of at least 1724 MPa and a density of about 1.96 gm/cm$^3$.

9. The laser mirror of claims 3 or 4 wherein the cooling channels are in a plane substantially parallel to the laser radiation reflecting surface and substantially parallel to each other.

* * * * *